(12) United States Patent
Kato et al.

(10) Patent No.: US 8,292,418 B2
(45) Date of Patent: Oct. 23, 2012

(54) AQUEOUS INK COMPOSITION, INK SET, AND INKJET IMAGE FORMING METHOD

(75) Inventors: Takahiro Kato, Kanagawa (JP);
Takahiro Ishizuka, Kanagawa (JP);
Tomoko Kuwabara, Kanagawa (JP);
Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 12/873,352

(22) Filed: Sep. 1, 2010

(65) Prior Publication Data
US 2011/0057983 A1 Mar. 10, 2011

(30) Foreign Application Priority Data

Sep. 8, 2009 (JP) ................................. 2009-207190

(51) Int. Cl.
*G01D 11/00* (2006.01)

(52) U.S. Cl. ........................................................ 347/100
(58) Field of Classification Search ..................... 347/20, 347/95, 96, 100
See application file for complete search history.

(56) References Cited

FOREIGN PATENT DOCUMENTS

| | | |
|---|---|---|
| EP | 0555069 A1 | 8/1993 |
| EP | 0799871 A1 | 10/1997 |
| EP | 1964896 A2 | 9/2008 |
| JP | 11172177 A | 6/1999 |
| JP | 2003-512484 A | 4/2003 |
| WO | 01/57145 A1 | 8/2001 |

*Primary Examiner* — An Do
(74) *Attorney, Agent, or Firm* — SOLARIS Intellectual Property Group, PLLC

(57) ABSTRACT

The invention provides an aqueous ink composition including: a) a water-based medium; b) a compound having an ethylenically unsaturated bond; and c) resin particles including a water-insoluble vinyl polymer and a water-insoluble photoinitiator.

11 Claims, No Drawings

AQUEOUS INK COMPOSITION, INK SET, AND INKJET IMAGE FORMING METHOD

CROSS-REFERENCE TO RELATED APPLICATION

This application claims priority under 35 USC 119 from Japanese Patent Application No. 2009-207190 filed Sep. 8, 2009, the disclosure of which is incorporated by reference herein.

BACKGROUND OF THE INVENTION

1. Field of the Invention

The present invention relates to an aqueous ink composition, an ink set, and an inkjet image forming method.

2. Description of the Related Art

In recent years, as demand for resource conservation, environment preservation, improvement in operational stability and the like has increased, use of aqueous coating materials and aqueous inks has been growing.

For example, UV-curable water-based inks have been known for a long time as a means for improving the fixability of a printed image obtained from a water-based ink.

As a water-soluble photoinitiator that is applicable to these UV-curable water-based inks, α-hydroxyketones, acylphosphine oxides and benzyl ketals are known.

A water-dispersed photoinitiator, in which an oil-soluble photoinitiator is dispersed in a water-based medium, is also known. For example, Japanese National Phase Publication No. 2003-512484 discloses an aqueous photoinitiator dispersion including an aqueous medium, a dispersant and an acylphosphine oxide photoinitiator. An aqueous photoinitiator dispersion of this kind is available from BASF Japan Inc. with a trade name of IRGACURE 819 DW. Further, for example, International Publication (WO) No. 2001/57145 discloses a photopolymerizable aqueous ink in which a monomer and a photoinitiator are included in oligomer particles being in an emulsion state.

However, in recent years, demand for improvement in speed and quality for printing has been increasing, and there is a strong need to impart sufficient fixability at a smaller amount of exposure, i.e., increase the sensitivity of a water-based photo initiator and achieve favorable dischargeability.

The present inventors have found that inks employing a known water-soluble photoinitiator do not exhibit sufficient curing sensitivity, and sufficient fixability cannot be obtained thereby. Furthermore, when a water-soluble group is introduced into an oil-soluble photoinitiator to form a water-soluble photoinitiator, there is a problem in that the molecular weight is increased due to the water-soluble group, and the number of moles of the photoinitiator contained in the ink is decreased, thereby lowering fixability.

Moreover, in the system in which the photoinitiator dispersion described in Japanese National Phase Publication No. 2003-512484 or the oligomer-containing ink described in WO 2001/57145 is applied to an inkjet ink, there is also a problem of insufficient dischargeability of ink, in addition to the problem concerning sensitivity. As such, it has been difficult to achieve both sufficient curing sensitivity (i.e., fixability) and sufficient dischargeability at the same time in inks employing known initiators.

SUMMARY OF THE INVENTION

In view of the above problems, the invention provides an aqueous ink composition including:

a) a water-based medium;
b) a compound having an ethylenically unsaturated bond; and
c) resin particles including a water-insoluble vinyl polymer and a water-insoluble photoinitiator.

DETAILED DESCRIPTION OF THE INVENTION

<Aqueous Ink Composition>

The aqueous ink composition of the present invention includes a water-based medium, at least one kind of compound having an ethylenically unsaturated bond, and at least one kind of initiator-containing resin particles that includes a water-insoluble vinyl polymer and a water-insoluble photoinitiator. As necessary, the aqueous ink composition may include further components.

By having this composition, the aqueous ink composition according to the invention can be cured at high sensitivity upon irradiation with active energy radiation, and favorable fixability can be achieved. Furthermore, when this aqueous ink composition is applied to an inkjet recording method, excellent dischargeability is also achieved.

The aqueous ink composition according to the invention may be used not only for forming a monochromatic image, but also for forming a full color image. In order to form a full color image, a magenta color ink, a cyan color ink and a yellow color ink may be used, and a black color ink may be additionally used in order to adjust the color tone. Furthermore, in addition to inks of yellow, magenta and cyan color, inks of red, green, blue, white and the like, or what is called spot-color ink used in the field of printing (for example, colorless ink) are also applicable.

(Initiator-containing Resin Particles)

The initiator-containing resin particles used in the invention contain at least one kind of water-insoluble vinyl polymer and at least one kind of water-insoluble photoinitiator. By having this constitution, the water-insoluble photoinitiator may be stably dispersed in a water-based medium.

(Water-insoluble Photoinitiator)

The water-insoluble photoinitiator used in the invention (hereinafter, also simply referred to as "initiator" or "water-insoluble initiator") is not particularly limited as long as it is a compound that is insoluble in water and is capable of initiating polymerization of a compound having an ethylenically unsaturated bond by the action of actinic energy radiation, and any conventionally known compounds may be used.

The water-insoluble photoinitiator according to the invention used in the invention is an initiator that dissolves in water at 25° C. in an amount of 5 g or less.

Examples of the initiator include acetophenones, α-aminoketones, benzophenones, alkylphenones, benzyls, benzoins, benzoin ethers, benzyl dialkyl ketals, thioxanthones, acylphosphine oxides, metal complexes, p-dialkylaminobenzoic acid, azo compounds and peroxide compounds. From the viewpoint of sensitivity and polymerization efficiency, acetophenones, α-aminoketones, benzyls, benzoin ethers, benzyl dialkyl ketals, thioxanthones, and acylphosphine oxides are preferred, and α-aminoketones and acylphosphine oxides are particularly preferred.

Specific examples of the compounds classified in the α-aminoketones include 2-methyl-1-phenyl-2-morpholinopropan-1-one, 2-methyl-1-[4-(hexyl)phenyl]-2-morpholinopropan-1-one and 2-ethyl-2-dimethylamino-1-(4-morpholinophenyl)-butanone-1. There are also commercially available products such as the IRGACURE series, trade name, manufactured by BASF Japan Inc., including IRGACURE 907, IRGACURE 369 and IRGACURE 379. These products are also included in the α-aminoketones, and may be suitably used for the invention.

Specific examples of the compounds classified in the acylphosphine oxides include 2,4,6-trimethylbenzoyl-diphenyl-phosphine oxide, and bis(2,4,6-trimethylbenzoyl)-phenylphosphine oxide.

Specific examples of the compounds classified in the alkylphenones include 2,2-dimethoxy-1,2-diphenylethan-1-one, 1-hydroxy-cyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, and 2-hydroxy-1-{4-[4-(2-hydroxy-2-methylpropionyl)-benzyl]phenyl}-2-methylpropane-1. These compounds are also available as commercially available products such as the IRGACURE series, trade name, manufactured by BASF Japan Inc., including IRGACURE 651, IRGACURE 184, IRGACURE 1173, IRGACURE 2959 and IRGACURE 127. These products may be suitably used for the invention.

Further examples of the initiator include the photopolymerization initiators described in Kato, Kiyomi, "Ultraviolet Curing System" (published by Sogo Gijutsu Center, 1988), pp. 65 to 148. These initiators may be used singly or in combination of two or more kinds, and these initiators may also be used together with a sensitizer.

The initiator preferably does not cause thermal decomposition at a temperature of up to 80° C. When the initiator has a thermal decomposition temperature of 80° C. or higher, storage stability of the ink composition may be enhanced.

(Water-insoluble Vinyl Polymer)

The water-insoluble vinyl polymer according to the invention is not particularly limited as long as it can form initiator-containing resin particles together with the water-insoluble photoinitiator, and can disperse in a water-based medium. According to the invention, the water-insoluble vinyl polymer is preferably a copolymer containing at least one kind of hydrophobic constituent unit and at least one kind of hydrophilic constituent unit, from the viewpoint of dispersion stability and dischargeability. It is more preferable that the hydrophilic constituent unit have at least one kind of anionic group, and it is even more preferable that the at least one kind of anionic group be a carboxyl group.

The water-insoluble vinyl polymer is preferably a water-insoluble polymer that can be in a dispersed state in an aqueous medium without a surfactant, because of its own hydrophilic functional group (preferably, a dissociable group or a salt thereof) (hereinafter, also referred to as "self-dispersing polymer"). The dispersed state as mentioned herein include both an emulsified state in which the water-insoluble vinyl polymer is dispersed in the aqueous medium in a liquid state (emulsion), and a dispersed state in which the water-insoluble vinyl polymer is dispersed in the aqueous medium in a solid state (suspension).

The water-insoluble vinyl polymer as mentioned herein is a polymer that dissolves, after being dried for 2 hours at 105° C., in 100 g of water at 25° C. in an amount of 10 g or less. This amount of dissolution is determined by neutralizing the polymer by 100% by using sodium hydroxide when the polymer has an anionic dissociable group, or by using acetic acid when the polymer has a cationic dissociable group.

The water-insoluble vinyl polymer preferably contains at least one kind of hydrophilic constituent unit, and this hydrophilic constituent unit may be any of a unit having an ion-dissociable group, a unit having a nonionic hydrophilic group, or a unit having both an ion-dissociable group and a nonionic hydrophilic group.

Examples of the ion-dissociable group include a cationic dissociable group such as a tertiary amino group, and an anionic dissociable group such as a carboxyl group, a sulfo group or a phosphoric acid group.

Examples of the nonionic hydrophilic group include a hydroxyl group, a polyalkyleneoxy group (preferably, a polyethyleneoxy group).

The water-insoluble vinyl polymer according to the invention is preferably a polymer containing an anionic ion-dissociable group, a polymer containing a nonionic hydrophilic group, or a polymer of a mixed type of the foregoing two types of polymers. The water-insoluble vinyl polymer is more preferably a polymer containing at least an anionic ion-dissociable group, and even more preferably a polymer having at least a carboxyl group.

The hydrophobic constituent unit is not particularly limited, and may be a unit having an aromatic group or a unit having an aliphatic group (including a cyclic aliphatic group).

Suitable examples of the water-insoluble vinyl polymer and the monomer that can form the water-insoluble vinyl polymer, and the production examples thereof include those described in paragraphs [0027] to [0057] and paragraphs [0108] to [0111] of Japanese Patent Application Laid-Open (JP-A) No. 2001-181549.

Other examples of the monomer include a cyano group-containing vinyl monomer (for example, acrylonitrile and methacrylonitrile), and a monomer having a carboxyl group, that is not directly bound to a polymer main chain upon formation of the polymer (for example, carboxyethyl acrylate, 4-vinylbenzoic acid, and 2-(2-acryloyloxyethyloxycarbonyl)propanoic acid).

When the water-insoluble vinyl polymer has a hydrophilic group, the hydrophilic group may be introduced into the water-insoluble vinyl polymer by copolymerizing a monomer having a hydrophilic group. The hydrophilic group (preferably, a dissociable group) may also be introduced by allowing a compound that can introduce a dissociable group such as an acid anhydride (for example, maleic anhydride) to react with a reactive group such as a hydroxy group or an amino group of the polymer after polymerization thereof.

It is also preferable to form a polymer having a dissociable group introduced at an end of the polymer chain, through radical polymerization of a vinyl monomer using a chain transfer agent, a polymerization initiator or an iniferter, each having an ion-dissociable group (or a substituent that can be derived into an ion-dissociable group), or through ionic polymerization using a compound having a dissociable group (or a substituent that can be derived into a dissociable group) as either an initiator or a terminator. Examples of such compounds and production examples thereof include those described in paragraphs [0085] to [0112] of JP-A No. 2001-262039.

When the hydrophilic group is an anionic dissociable group, the anionic dissociable group may form a salt with an alkali metal ion (for example, $Na^+$ or $K^+$), an ammonium ion, or the like. When the hydrophilic group is a cationic dissociable group, the cationic dissociable group may form a salt with an organic acid (for example, acetic acid, propionic acid or methanesulfonic acid), an inorganic acid (for example, hydrochloric acid or sulfuric acid) or the like.

When the water-insoluble vinyl polymer contains a dissociable group, the content of the dissociable group is preferably from 0.1 to 3.0 mmol/g, more preferably from 0.2 to 2.0 mmol/g, based on the total amount of the water-insoluble polymer. When the content of the dissociable group is 0.1 mmol/g or more, dispersion stability may be further improved. When the content of the dissociable group is 3.0 mmol/g or less, water solubility may be prevented from becoming too high, and dispersibility of the water-insoluble photoinitiator may be prevented from lowering.

The weight average molecular weight (Mw) of the water-insoluble vinyl polymer is typically from 1,000 to 200,000, preferably from 2,000 to 100,000. When the weight average molecular weight is 1,000 or more, dispersibility of the initiator-containing resin particles may be favorable and a stable dispersion may be obtained. When the weight average molecular weight is 200,000 or less, solubility of the polymer in an organic solvent may be prevented from lowering, and viscosity of a solution of the polymer in an organic solvent may be prevented from increasing, thereby enhancing dispersibility.

Specific examples of the water-insoluble vinyl polymer include polymers P-22 to P-105 described in JP-A No. 2001-181549, polymers PA-1 to PA-11 described in JP-A No. 2004-75818, and polymers P-1 to P-120 described in JP-A No. 2001-262039. The following are other specific examples of the water-insoluble polymer (polymers B-01 to B-12). The ratio described in the parentheses is on a mass basis.

It should be noted that the invention is not limited to these specific examples.

B-01: Methyl methacrylate/2-methoxyethyl acrylate/benzyl methacrylate/methacrylic acid copolymer (47/10/34/9)

B-02: Phenoxyethyl methacrylate/methyl methacrylate/methacrylic acid copolymer (50/40/10)

B-03: Phenoxyethyl acrylate/ethyl acrylate/acrylic acid copolymer (30/65/5)

B-04: Methyl methacrylate/dicyclopentanyl methacrylate/benzyl methacrylate/methacrylic acid copolymer (43/17/30/10)

B-05: Methyl methacrylate/isobornyl methacrylate/methacrylic acid copolymer (38/52/10)

B-06: Methyl methacrylate/tert-butyl methacrylate/isobornyl methacrylate/methacrylic acid copolymer (35/10/45/10)

B-07: Benzyl acrylate/methyl methacrylate/acrylic acid copolymer (50/45/5)

B-08: Phenoxyethyl methacrylate/benzyl acrylate/ethyl methacrylate/methacrylic acid copolymer (32/20/40/8)

B-09: Methyl methacrylate/isobornyl methacrylate/hydroxyethyl methacrylate/methacrylic acid copolymer (40/48/5/7)

B-10: Benzyl methacrylate/isobutyl methacrylate/cyclohexyl methacrylate/methacrylic acid copolymer (35/30/30/5)

B-11: Methyl methacrylate/isobornyl methacrylate copolymer (50/50) in which 2-mercaptosuccinic acid is used as a chain transfer agent B-12: Butyl methacrylate/phenoxyethyl acrylate copolymer (40/60) in which 2-mercaptosuccinic acid is used as a chain transfer agent B-13: Butyl methacrylate/phenoxyethyl acrylate copolymer (50/50) in which sodium 2-mercaptoethanesulfonate as a chain transfer agent (Production of Initiator-containing Resin Particles)

The initiator-containing resin particles according to the invention are preferably in the form of a dispersion of initiator-containing resin particles, in which initiator-containing resin particles containing a water-insoluble photoinitiator and a water-insoluble vinyl polymer are dispersed in a water-based medium (an aqueous liquid medium containing at least water).

Methods of producing the dispersion of the initiator-containing resin particles include, for example, a method of preparing a dispersion of the water-insoluble vinyl polymer, and then impregnating the initiator with this dispersion; or a method of performing co-emulsification dispersion. Among these, the co-emulsification dispersion method is preferred, and a suitable example of the co-emulsification dispersion method is a method of emulsifying and dispersing an organic solvent phase containing the water-insoluble vinyl polymer and the initiator, by either adding water to the organic solvent phase or adding the organic solvent phase to water, and thereby forming microparticles of the organic solvent phase.

First, the method of preparing a dispersion of the water-insoluble vinyl polymer and then impregnating the initiator-containing resin particles with this dispersion will be explained. A first example of this method includes a first step of preparing a dispersion of the water-insoluble vinyl polymer; a second step of preparing an initiator solution prepared by dissolving the water-insoluble photoinitiator in an organic solvent; and a third step of preparing a dispersion of initiator-containing resin particles by mixing the initiator solution with the vinyl polymer dispersion.

A second example of the method includes a first step of preparing a dispersion of the water-insoluble vinyl polymer; a second step of preparing an initiator solution having the water-insoluble photoinitiator dissolved in an organic solvent, mixing this initiator solution with a solution containing at least water, thereby preparing an initiator dispersion; and a third step of preparing a dispersion of initiator-containing resin particles by mixing the dispersion of the water-insoluble vinyl polymer and the initiator dispersion.

By performing a method mentioned as the above first and second examples, the dispersion of the initiator-containing resin particles may be prepared.

Next, the co-emulsification dispersion method will be explained. A first example of this method includes a first step of preparing a vinyl polymer initiator solution by dissolving the water-insoluble photoinitiator and the water-insoluble vinyl polymer in an organic solvent; and a second step of preparing a dispersion of initiator-containing resin particles by mixing the vinyl polymer initiator solution with a solution containing at least water.

A second example of this method includes a first step of preparing an initiator solution by dissolving the water-insoluble photoinitiator in an organic solvent; a second step of preparing a vinyl polymer solution in which the water-insoluble vinyl polymer is dissolved; and a third step of preparing a dispersion of initiator-containing resin particles by mixing the initiator solution and the vinyl polymer solution with a solution containing at least water.

A third example of this method includes a first step of preparing an initiator solution by dissolving the water-insoluble photoinitiator in an organic solvent, and preparing an initiator microparticle dispersion liquid by mixing this initiator solution with a solution containing at least water; a second step of preparing a vinyl polymer dispersion by preparing a vinyl polymer solution in which the water-insoluble vinyl polymer is dissolved, and mixing this vinyl polymer solution with a solution containing at least water; and a third step of preparing a dispersion of initiator-containing resin particles by mixing the initiator dispersion and the vinyl polymer dispersion.

A fourth example of this method includes a first step of preparing a vinyl polymer solution by dissolving the water-insoluble vinyl polymer in an organic solvent; a second step of preparing an initiator dispersion by preparing an initiator solution in which the water-insoluble photoinitiator is dissolved, and mixing this initiator solution with a solution containing at least water; and a third step of preparing a dispersion of initiator-containing resin particles by mixing the vinyl polymer solution and the initiator dispersion.

In the preparation of the dispersion of initiator-containing resin particles, it is preferable to use at least one kind of organic solvent, and this preparation process more preferably includes a further step of removing at least part of the organic solvent. In particular, when the solubility of the organic solvent in water is 10% by mass or less, or when the vapor pressure of the organic solvent is greater than that of water, the dispersion stability of the dispersion of initiator-containing resin particles can be further improved by including a step of removing at least part of the organic solvent.

Removal of the organic solvent may be carried out by any conventional method. For example, removal of the organic solvent may be carried out at a temperature of from 10 to 100° C. under normal pressure or reduced pressure, preferably at from 40 to 100° C. under normal pressure, or at from 10 to 50° C. under reduced pressure.

The organic solvent used for preparing the dispersion of initiator-containing resin particles is not particularly limited, and may be appropriately selected in accordance with the solubility of the water-insoluble photoinitiator or the water-insoluble vinyl polymer. Examples of the organic solvent include ketone-based solvents such as acetone, methyl ethyl ketone and diethyl ketone; alcohol-based solvents such as methanol, ethanol, 2-propanol, 1-propanol, 1-butanol and tert-butanol; chlorine-based solvents such as chloroform and methylene chloride; aromatic solvents such as benzene and toluene; ester-based solvents such as ethyl acetate, butyl acetate and isopropyl acetate; ether-based solvents such as diethyl ether, tetrahydrofuran and dioxane; glycol ether-based solvents such as ethylene glycol monomethyl ether and ethylene glycol dimethyl ether. These organic solvents may be used singly, or may be used in combination of two or more kinds.

The content of the water-insoluble vinyl polymer in the initiator-containing resin particles is preferably from 10 to 1,000 parts by mass, more preferably from 20 to 400 parts by mass, with respect to 100 parts by mass of the water-insoluble photoinitiator. When the content of the water-insoluble vinyl polymer is 10 parts by mass or greater, a stable dispersion with a fine particle size may be readily produced. When the content is 1,000 parts by mass or less, the proportion of the water-insoluble photoinitiator in the dispersion of initiator-containing resin particles may be prevented from decreasing, thereby making it easy to afford formulation design when the initiator dispersion is included in a water-based ink composition, and enhancing the curing sensitivity.

The volume average particle size of the initiator-containing resin particles is preferably from 1 to 200 nm, more preferably from 3 to 100 nm, and even more preferably from 5 to 80 nm, from the viewpoint of dispersion stability and curing sensitivity, and the volume average particle size is particularly preferably from 10 to 50 nm. The volume average particle size may be regulated by changing the conditions for preparation of dispersion, centrifugation, filtration, or the like. The volume average particle size may be measured by a conventional method using a light scattering method.

The initiator-containing resin particles according to the invention preferably contain, from the viewpoint of curing sensitivity and dischargeability, a water-insoluble vinyl polymer which includes a hydrophilic constituent unit having an anionic group and has a weight average molecular weight of from 1,000 to 200,000, and a water-insoluble photoinitiator, in which the content of the water-insoluble vinyl polymer is from 10 to 1,000 parts by mass with respect to 100 parts by mass of the water-insoluble photoinitiator. More preferably, the initiator-containing resin particles contain a water-insoluble vinyl polymer which contains a hydrophilic constituent unit having a carboxyl group and has a weight average molecular weight of from 2,000 to 100,000, and a water-insoluble photoinitiator, in which the content of the water-insoluble vinyl polymer is from 20 to 400 parts by mass with respect to 100 parts by mass of the water-insoluble photoinitiator.

Further, from the viewpoint of curing sensitivity and dischargeability, the initiator-containing resin particles according to the invention preferably contain a water-insoluble vinyl polymer which contains a hydrophilic constituent unit having an anionic group and has a weight average molecular weight of from 1,000 to 200,000, and a water-insoluble photoinitiator, and the volume average particle size of the initiator-containing resin particles is from 3 to 200 nm. More preferably, the initiator-containing resin particles contain a water-insoluble vinyl polymer which contains a hydrophilic constituent unit having a carboxyl group and a weight average molecular weight of from 2,000 to 100,000, and a water-insoluble photoinitiator, and the volume average particle size of the initiator-containing resin particles is from 5 to 80 nm.

The content of the initiator-containing resin particles in the aqueous ink composition according to the invention is not particularly limited, but from the viewpoint of curing sensitivity and dischargeability, the content of the initiator-containing resin particles (in terms of the content of the water-insoluble photoinitiator) is preferably in the range of from 0.1 to 7% by mass, and particularly preferably in the range of from 0.3 to 5% by mass, with respect to the total amount of the aqueous ink composition.

Furthermore, from the viewpoint of curing sensitivity and dischargeability, the content of the water-insoluble photoinitiator is preferably in the range of from 0.01 to 35 parts by mass, more preferably from 0.1 to 25 parts by mass, and even more preferably from 0.5 to 15 parts by mass, with respect to 100 parts by mass of the ethylenically unsaturated compound.

Here, the content of the water-insoluble photoinitiator indicates the total content of initiator included in the aqueous ink composition, and when two or more kinds of initiators are contained, it corresponds to the total of the respective contents.

(Compound Having Ethylenically Unsaturated Bond)

The aqueous ink composition according to the invention contains at least one kind of compound having an ethylenically unsaturated bond. The compound having an ethylenically unsaturated bond may be either water-insoluble or water-soluble, but preferably a water-soluble compound having an ethylenically unsaturated bond (hereinafter, also referred to as "specific polymerizable compound").

The specific polymerizable compound may be any compound as long as it is water-soluble and has at least one ethylenically unsaturated bond capable of radical polymerization in its molecule, including those having a chemical form of a monomer, an oligomer, a polymer or the like. The specific polymerizable compound may be used singly, or two or more kinds thereof may be used together at any arbitrary ratio for enhancing the desired characteristics. Preferably, it is desirable to use two or more kinds in combination in view of controlling the performances such as reactivity or physical properties. Furthermore, from the viewpoint of discharge stability of the ink, it is preferable to use a compound that is highly soluble in water and is difficult to precipitate in an aqueous ink composition.

The specific polymerizable compound used in the invention is a compound that dissolves in distilled water at 25° C. at a proportion of 2% by mass or more, preferably dissolves at a proportion of 15% by mass or more, and particularly preferably uniformly miscible with water at a certain proportion.

Examples of the specific polymerizable compound include unsaturated carboxylic acids such as acrylic acid, methacrylic acid, itaconic acid, crotonic acid, isocrotonic acid and maleic acid; ester derivatives and amide derivatives thereof, and salts thereof; anhydrides having an ethylenically unsaturated group, acrylonitrile, styrene, other various kinds of unsaturated polyesters, unsaturated polyethers, unsaturated polyamides, unsaturated urethanes, vinyl ethers, allyl ethers, and the like. Among them, the specific polymerizable compound is preferably at least one selected from acrylic acid or methacrylic acid, ester derivatives thereof, amide derivatives thereof, and salts thereof, more preferably at least one selected from monoesters of acrylic acid or monoesters of methacrylic acid (hereinafter, also referred to as "monoacrylates"), esters of acrylic acid and polyol compounds, and esters of methacrylic acid and polyol compounds (hereinafter, also referred to as "polyfunctional acrylate monomers" or "polyfunctional acrylate oligomers"), acrylamides and methacrylamides, and derivatives thereof.

From the viewpoint of imparting water-solubility, the specific polymerizable compound used in the invention preferably has at least one of a poly(ethyleneoxy) chain, a poly(propyleneoxy) chain, an ionic group (for example, a carboxyl group or a sulfo group), or a hydroxy group.

When the specific polymerizable compound has a poly(ethyleneoxy) chain or a poly(propyleneoxy) chain, the number of the ethyleneoxy unit or the propyleneoxy unit is preferably in the range of from 1 to 10, more preferably in the range of from 1 to 5. When the number of the unit is 10 or less, hardness of the cured film or adhesiveness of the same to a recording medium, or the like, may be improved.

Among the specific polymerizable compounds, particularly preferred specific examples of the monoacrylates, polyfunctional acrylate monomers and polyfunctional acrylate oligomers include compounds having the following structures. However, the invention is not limited to these specific polymerizable compounds.

Exemplary Compound 2-1

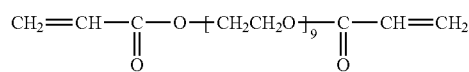

Exemplary Compound 2-2

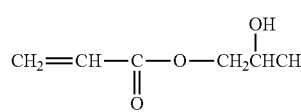
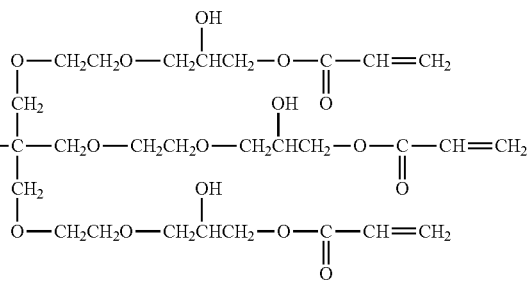

Exemplary Compound 2-3

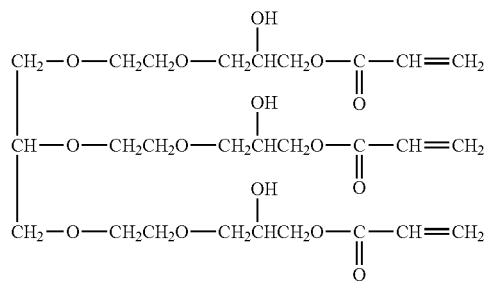

Exemplary Compound 2-4

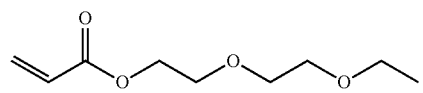

Exemplary Compound 2-5

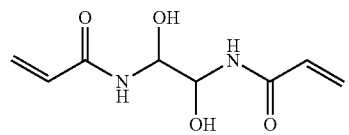

In addition to the above example compounds, a compound having an ionic group, such as a potassium salt of methacrylic acid or 3-sulfopropylacrylate, may also be preferably used.

The specific polymerizable compound according to the invention may be used singly or in combination of two or more compounds.

Furthermore, according to the invention, it is also preferable to use at least one kind of monoacrylate in combination with a polyfunctional acrylate monomer or a polyfunctional acrylate oligomer having a molecular weight of 400 or more, preferably 500 or more, as the specific polymerizable compound, so as to further improve sensitivity, bleeding and adhesiveness to a recording medium. In particular, in an ink composition used for recording on a flexible medium such as a PET film or a PP film, combined use of a monoacrylate and a polyfunctional acrylate monomer or a polyfunctional acrylate oligomer, selected from the group of compounds mentioned above, is preferable since strength of the film formed from the ink can be enhanced while increasing its adhesiveness by imparting flexibility thereto.

Furthermore, it is more preferable to employ at least three kinds of specific polymerizable compounds including a monofunctional monomer, a bifunctional monomer and a polyfunctional (tri- or higher-functional) monomer, from the viewpoint of further improving the sensitivity, bleeding and adhesiveness to a recording medium while maintaining safety.

The content ratio of the compound having an ethylenically unsaturated bond in the aqueous ink composition according to the invention is preferably from 1 to 30% by mass, more preferably from 5 to 20% by mass, based on the total amount of the aqueous ink composition.

(Water-based Medium)

The aqueous ink composition according to the invention contains a water-based medium. The water-based medium includes water as a main solvent, and may include at least one kind of organic solvent as necessary. In the invention, water that does not contain ionic impurities, such as ion-exchanged water or distilled water, is preferably used.

The content ratio of water in the aqueous ink composition according to the invention may be appropriately selected according to the purpose, but the content ratio is typically preferably from 10 to 95% by mass, more preferably from 30 to 90% by mass.

(Organic Solvent)

The aqueous ink composition according to the invention contains water as a solvent, but preferably further contains at least one kind of organic solvent. When the aqueous ink composition contains an organic solvent, non-volatility can be imparted to the aqueous ink composition, the viscosity thereof can be decreased, and the wettability thereof can be improved.

The organic solvent may be used as an anti-drying agent, a wetting agent, a penetration promoting agent, or the like.

The anti-drying agent may effectively prevent clogging of nozzles that may be caused as a result of drying of the ink at ink discharge ports. The anti-drying agent is preferably a water-soluble organic solvent having a lower vapor pressure than that of water.

Specific examples of the anti-drying agent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohols, such as ethylene glycol monomethyl (or ethyl)ether, diethylene glycol monomethyl (or ethyl)ether, and triethylene glycol monoethyl (or butyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among them, polyhydric alcohols such as glycerin and diethylene glycol are preferred as the anti-drying agent. The anti-drying agents as mentioned above may be used singly, or may be used in combination of two or more kinds The penetration promoting agent is suitably used for the purpose of facilitating penetration of the ink composition into a recording medium (printing paper).

Specific examples of the penetration promoting agent that may be suitably used include alcohols such as ethanol, isopropanol, butanol, di(tri)ethylene glycol monobutyl ether and 1,2-hexanediol; nonionic surfactants such as sodium lauryl sulfate and sodium oleate. The penetration promoting agent is preferably used in an amount that does not cause bleeding of a printed image or paper slipping (print-through).

The water-soluble organic solvent may also be used for adjusting viscosity, in addition to the purposes described above. Specific examples of the water-soluble organic solvent that may be used for adjusting viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

According to the invention, the organic solvent is preferably selected from glycerin, ethylene glycol, diethylene glycol and mixtures thereof, which compounds exhibiting excellent performances even with regard to inkjet recording suitability.

According to the invention, the organic solvent is typically preferably contained at a proportion of from 0.5 to 5% by mass based on the total amount of the aqueous ink composition.

(Colorant)

The aqueous ink composition according to the invention may not substantially contain a colorant, but preferably contains at least one kind of colorant.

In the invention, known dyes, pigments or the like may be used as the colorant without any particular limitation. Among them, a colorant which is almost insoluble or only sparingly soluble in water, is preferred in view of colorability of the ink. Specific examples of the colorant include various kinds of pigments, dispersion dyes, oil-soluble dyes, coloring matters that form a J-aggregate. From the viewpoint of light fastness, the colorant is more preferably a pigment.

The type of the pigment according to the invention is not particularly limited, and any conventionally known organic and inorganic pigments may be used.

Examples of the organic pigment include azo pigments, polycyclic pigments, dye chelates, nitro pigments, nitroso pigments and aniline black. Among these, azo pigments, polycyclic pigments and the like are more preferred. Examples of the azo pigments include azo lakes, insoluble azo pigments, condensed azo pigments and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments and quinophthalone pigments. Examples of the dye chelates include basic dye chelates and acidic dye chelates.

Examples of the inorganic pigment include titanium oxide, iron oxide, calcium carbonate, barium sulfate, aluminum hydroxide, barium yellow, cadmium red, chrome yellow and carbon black. Among these, carbon black is particularly preferred. Examples of the carbon black include products produced according to a known method such as a contact method, a furnace method, or a thermal method.

Specific examples of the pigment that may be used in the invention include the pigments described in paragraphs [0142] to [0145] of JP-A No. 2007-100071.

Among them, from the viewpoint of colorability and color tone, the pigment included in ink having a yellow color ink is C.I. Pigment Yellow 74 (PY74), the pigment included in ink having a magenta color is C.I. Pigment Red 122 (PR122), and the pigment included in ink having a cyan color is C.I. Pigment Blue 15:3 (PB15:3). The pigment included in ink having a black color is preferably carbon black.

When a dye is used as a coloring component in the invention, a dye supported on a water-insoluble carrier may be used as a colorant. Any known dyes may be used as the dye without any particular limitation, and for example, the dyes described in JP-A Nos. 2001-115066, 2001-335714, 2002-249677 and the like may be suitably used also in the invention. The carrier is not particularly limited as long as it is insoluble or sparingly soluble in water, and an inorganic material, an organic material or a composite material thereof may be used. Specifically, the carriers described in JP-A Nos. 2001-181549, 2007-169418 and the like may be suitably used also in the invention.

The carrier supporting the dye (colorant) may be used directly, or in combination with a dispersant, as necessary. The dispersants as mentioned above may be suitably used as the dispersant.

For example, when a pigment is used as a colorant for the aqueous ink composition according to the invention, the concentration of pure pigment (not including a surface treating agent or a dispersant) in the aqueous ink composition is generally preferably in the range of from 0.3 to 10% by mass based on the total amount of the aqueous ink composition. Although the coloring power of the pigment is dependent also on the dispersed state of the pigment particles, when the concentration of the pigment is in the range of about 0.3 to 1% by mass, the aqueous ink composition may be used as an ink having a lighter color tone. When the concentration of the pigment is greater than this range, the aqueous ink composition may be used as an ink having for ordinary coloring applications.

(Dispersant)

If the colorant according to the invention is a pigment, it is preferably dispersed in a water-based solvent by using a dispersant. The dispersant may be a polymeric dispersant, or a surfactant-type dispersant having a low molecular weight. The polymeric dispersant may be a water-soluble dispersant, or may be a non-water-soluble dispersant.

The surfactant-type dispersant having a low molecular weight (hereinafter, also referred to as "low molecular weight dispersant") may be added for the purpose of stably dispersing an organic pigment in a water-based solvent, while maintaining the low viscosity of the ink. The low molecular weight dispersant as used herein is a low molecular weight dispersant having a molecular weight of 2,000 or less. The molecular weight of the low molecular weight dispersant is preferably from 100 to 2,000, more preferably from 200 to 2,000.

The low molecular weight dispersant has a structure that includes both a hydrophilic group and a hydrophobic group. One molecule includes at least one hydrophilic group and at least one hydrophobic group, respectively, and two or more kinds of hydrophilic group or hydrophobic groups may be included in one molecule. The low molecular weight dispersant may also include a linking group for linking the hydrophilic group and the hydrophobic group.

Examples of the hydrophilic group include an anionic group, a cationic group, a nonionic group, and a betaine group in which these groups are combined.

The anionic group is not particularly limited as long as it has a negative charge, but the anionic group is preferably a phosphoric acid group, a phosphonic acid group, a phosphinic acid group, a sulfuric acid group, a sulfonic acid group, a sulfinic acid group or a carboxylic acid group, more preferably a phosphoric acid group or a carboxylic acid group, and even more preferably a carboxylic acid group.

The cationic group is not particularly limited as long as it has a positive charge, but the cationic group is preferably an organic cationic substituent, more preferably a cationic group containing nitrogen or phosphorus, even more preferably a cationic group containing nitrogen. Among them, a pyridinium cation or an ammonium cation is particularly preferred.

The nonionic group is not particularly limited as long as it has neither a negative charge nor a positive charge. Examples of the nonionic group include polyalkylene oxide, polyglycerin, and part of a sugar unit.

In the invention, the hydrophilic group is preferably an anionic group, from the viewpoint of dispersion stability and aggregation properties of the pigment.

When the low molecular weight dispersant has an anionic hydrophilic group, the pKa of the dispersant is preferably 3 or greater, from the viewpoint of promoting aggregation reaction by contacting the dispersant with an acidic treatment liquid. The pKa of the low molecular weight dispersant according to the invention is a value experimentally determined from a titration curve, which is obtained by titrating a solution of tetrahydrofuran:water=3:2 (V/V) in which the low molecular weight dispersant is dissolved at a concentration of 1 mmol/L, with an aqueous solution of acid or alkali.

From a theoretical standpoint, when the pKa value of the low molecular weight dispersant is 3 or greater, 50% or more of the anionic groups become non-dissociated upon contact with a treatment liquid having a pH of about 3. Accordingly, water-solubility of the low molecular weight dispersant is significantly decreased, whereby aggregation reaction is caused. In other words, the aggregation reactivity is increased. From this point of view, the low molecular weight dispersant preferably has a carboxylic acid group as an anionic group.

On the other hand, the hydrophobic group may have any of a hydrocarbon-based structure, a fluorocarbon-based structure, a silicone-based structure or the like, but the hydrophobic group is particularly preferably a hydrocarbon-based group. The hydrophobic group may have either a straight-chained structure or a branched structure. The hydrophobic group may also have a single-chained structure or a structure having two or more chains, and when the hydrophobic group has a structure having two or more chains, two or more kinds of hydrophobic groups may be included therein.

The hydrophobic group is preferably a hydrocarbon group having 2 to 24 carbon atoms, more preferably a hydrocarbon group having 4 to 24 carbon atoms, even more preferably a hydrocarbon group having 6 to 20 carbon atoms.

Among the polymeric dispersant according to the invention, a hydrophilic macromolecular compound may be used as a water-soluble dispersant, and the hydrophilic macromolecular compound may be any of a naturally occurring hydrophilic macromolecular compound, a chemically modified hydrophilic macromolecular compound derived from a natural product as a raw material, or a synthetic water-soluble macromolecular compound.

Examples of the naturally occurring hydrophilic macromolecular compound include plant-based macromolecules such as gum arabic, tragacanth gum, guar gum, gum karaya, locust bean gum, arabinogalactone, pectin, and quince seed starch; seaweed-based macromolecules such as alginic acid, carrageenan, and agar; animal-based macromolecules such as gelatin, casein, albumin, and collagen; and microbial macromolecules such as xanthene gum and dextran.

Examples of the chemically modified hydrophilic macromolecular compound derived from a natural product as a raw material include cellulose-based macromolecules such as methylcellulose, ethylcellulose, hydroxyethylcellulose, hydroxypropylcellulose, and carboxymethylcellulose; starch-based macromolecules such as sodium starch glycolate and sodium starch phosphate; and seaweed-based macromolecules such as alginic acid propylene glycol ester.

Furthermore, examples of the synthetic water-soluble macromolecular compound include vinyl-based macromolecules such as polyvinyl alcohol, polyvinylpyrrolidone, and polyvinyl methyl ether; acrylic resins such as polyacrylamide, polyacrylic acid or alkali metal salts thereof, and water-soluble styrene acrylic resins; water-soluble styrene maleic acid resins, water-soluble vinylnaphthalene acrylic resins, water-soluble vinylnaphthalene maleic acid resins, polyvinylpyrrolidone, polyvinyl alcohol; macromolecular compounds having an alkali metal salt of a β-naphthalenesulfonic acid-formalin condensate, or a salt of a cationic functional group such as a quaternary ammonium group or an amino group in its side chain.

Among these, a macromolecular compound containing a carboxyl group is preferred from the viewpoint of dispersion stability and aggregation properties of the pigment. For example, macromolecular compounds containing a carboxyl group, including an acrylic resin such as a water-soluble styrene acrylic resin, a water-soluble styrene maleic acid resin, a water-soluble vinylnaphthalene acrylic resin, and a water-soluble vinylnaphthalene maleic acid resin, are particularly preferred.

As the non-water-soluble dispersant among the polymeric dispersants, a polymer having both a hydrophobic moiety and a hydrophilic moiety may be used. Examples thereof include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

The weight average molecular weight of the polymeric dispersant according to the invention is preferably from 3,000 to 200,000, more preferably from 5,000 to 100,000, even more preferably from 5,000 to 80,000, and particularly preferably from 10,000 to 60,000.

The weight average molecular weight may be measured by, for example, gel permeation chromatography (GPC).

The mixing ratio by mass of the pigment and the dispersant (pigment:dispersant) is preferably in the range of from 1:0.06 to 1:3, more preferably in the range of from 1:0.125 to 1:2, and even more preferably from 1:0.125 to 1:1.5.

According to the invention, the volume average particle size of the colorant is preferably from 10 to 200 nm, more preferably from 10 to 150 nm, and even more preferably from 10 to 100 nm. When the volume average particle size is 200 nm or smaller, favorable color reproducibility may be achieved, and in the case of an inkjet system, favorable droplet discharge properties may be achieved. Furthermore, when the volume average particle size is 10 nm or greater, favorable light fastness may be achieved.

The particle size distribution of the colorant is not particularly limited, and may be either a broad particle size distribution or a monodisperse particle size distribution. It is also acceptable to use a mixture of two or more kinds of colorants having different values of monodisperse particle size distribution.

The volume average particle size and particle size distribution of the colorant may be measured by, for example, a light scattering method.

In the invention, the colorant may be used singly, or two or more colorants may be used in combination.

The aqueous ink composition according to the invention may be transparent without including a colorant (hereinafter, also referred to as "aqueous clear ink composition"). The aqueous clear ink composition may be used for forming an undercoat that imparts suitability for image printing to a recording medium, or an overcoat for protecting the surface of an image formed from ordinary ink, or for imparting decoration or gloss to the image, or other purposes. The aqueous clear ink composition may contain a colorless pigment or colorless particles, which are not used for coloring, in a dispersed state. By adding these materials, image quality, reliability or processability (handleability) of a printed material may be enhanced in either case of using the ink composition for an undercoat or an overcoat.

When the aqueous ink composition according to the invention is formed as an aqueous clear ink composition, the content of the specific polymerizable compound is preferably from 10 to 70% by mass with respect to the total amount of the aqueous ink composition. Further, the aqueous clear ink composition preferably contains the water-insoluble polymerization initiator in an amount of from 1 to 10 parts by mass with respect to 100 parts by mass of the specific polymerizable compound, and at the same time, the amount of water-insoluble polymerization initiator is 0.5 parts by mass or more with respect to 100 parts by mass of the aqueous clear ink composition.

(Surface Tension Adjusting Agent)

The aqueous ink composition according to the invention preferably contains at least one kind of surface tension adjusting agent. When the ink composition contains a surface tension adjusting agent, the surface tension may be adjusted to an appropriate value in accordance with the image forming method. For example, in the case of using the aqueous ink composition in an inkjet recording method, the surface tension of the aqueous ink composition may be optimized from the viewpoint of balancing its curing and penetration, so that an image with high quality and high density may be formed on, in particular, ordinary paper.

Examples of the surface tension adjusting agent include nonionic, cationic, anionic and betaine surfactants. The amount of the surface tension adjusting agent is preferably determined such that the surface tension of the ink according to the invention is adjusted to be from 20 to 60 mN/m, more preferably from 20 to 45 mN/m, and even more preferably from 25 to 40 mN/m, in order to achieve favorable ink discharge by an inkjet method.

It is effective to use a compound having a structure having both a hydrophilic moiety and a hydrophobic moiety in its molecule as the surfactant according to the invention, and any of an anionic surfactant, a cationic surfactant, an amphoteric surfactant and a nonionic surfactant may be used. A polymeric compound (for example, a polymeric dispersant) may also be used as a surfactant.

Specific examples of the anionic surfactant include, for example, sodium dodecyl benzenesulfonate, sodium lauryl sulfate, sodium alkyl diphenyl ether disulfonate, sodium alkyl naphthalenesulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenyl ether sulfate, sodium dialkyl sulfosuccinate, sodium stearate, sodium oleate, t-octylphenoxyethoxy polyethoxyethyl sulfuric acid sodium salt. These compounds may be used singly or in combination of two or more kinds Specific examples of the nonionic surfactant include polyoxyethylene lauryl ether, polyoxyethylene octyl phenyl ether, polyoxyethylene oleyl phenyl ether, polyoxyethylene nonyl phenyl ether, an oxyethylene-oxypropylene block copolymer, t-octylphenoxyethyl polyethoxyethanol, and nonylphenoxyethyl polyethoxyethanol. These compounds may be used singly or in combination of two or more kinds Examples of the cationic surfactant include a tetraalkylammonium salt, an alkylamine salt, a benzalkonium salt, an alkylpyridium salt, and an imidazolium salt. Specific examples thereof include dihydroxyethylstearylamine, 2-heptadecenyl-hydroxyethylimidazoline, lauryldimethylbenzylammonium chloride, cetylpyridinium chloride, and stearamidomethylpyridium chloride.

The amount of the surfactant to be added to the aqueous ink composition is not particularly limited, but is preferably 1% by mass or more, more preferably from 1 to 10% by mass, even more preferably from 1 to 3% by mass.

(Resin Particles)

The aqueous ink composition according to the invention may further contain resin particles for the purpose of increasing fixability and abrasion resistance of the printed material. Examples of the resin particles that may be used in the invention include particles of an acrylic resin, a vinyl acetate-based resin, a styrene-butadiene-based resin, a vinyl chloride-based resin, an acrylic-styrene-based resin, a butadiene-based resin, a styrene-based resin, a crosslinked acrylic resin, a crosslinked styrene-based resin, a benzoguanamine resin, a phenol resin, a silicone resin, an epoxy resin, a urethane-based resin, a paraffin-based resin, a fluorine-based resin, or latexes thereof. Preferred examples thereof include particles of an acrylic resin, an acrylic-styrene-based resin, a styrene-based resin, a crosslinked acrylic resin, and a crosslinked styrene-based resin.

These resin particles may also be used in the form of latex.

The weight average molecular weight of the resin particles is preferably from 10,000 to 200,000, more preferably from 100,000 to 200,000.

The average particle size of the resin particles is preferably in the range of from 10 nm to 1 μm, more preferably in the range of from 10 to 200 nm, even more preferably in the range of from 20 to 100 nm, particularly preferably in the range of from 20 to 50 nm.

The glass transition temperature (Tg) of the resin particles is preferably 30° C. or higher, more preferably 40° C. or higher, even more preferably 50° C. or higher.

The amount of addition of the resin particles is preferably from 0.1 to 20% by mass, more preferably from 0.1 to 20% by mass, even more preferably from 0.1 to 15% by mass, based on the amount of the ink.

The particle size distribution of the resin particles is not particularly limited, and either particles having a broad particle size distribution or particles having a monodisperse particle size distribution may be used. Furthermore, two or more kinds of resin particles having different values of monodisperse particle size distribution may be used as a mixture.

(Other Additives)

In the invention, the aqueous ink composition may optionally contain a further additive in addition to the compounds described above. Examples of the additive include a pH adjusting agent, a leveling agent, a viscosity adjusting agent, an oxidation inhibitor, a hindered amine light stabilizer (HALS), a preservative, and an antifungal agent. When an additive use, the amount thereof is typically from 0.1 to 5% by mass with respect to the total amount of the aqueous ink composition.

When the aqueous ink composition according to the invention is applied to, for example, an inkjet recording system, the viscosity of the composition is preferably in the range of from 5 mPa·s to 15 mPa·s. In the case of an inkjet recording system in which fine, high-density, high-driving frequency nozzles are employed, the upper limit of the viscosity is preferably 10 mPa·s.

The viscosity of the aqueous ink composition may be measured by, for example, using a Brookfield viscometer at 20° C.

The surface tension of the ink composition is preferably in the range of from 35 mN/m (dyne/cm) to 50 mN/m, in view of performing printing on ordinary paper. In a conventional aqueous inkjet ink, a bleeding phenomenon may be suppressed by adjusting the surface tension to as low as about 30 mN/m, and allowing the ink to penetrate the recording medium in a short time. In that case, however, the image density may decrease. On the contrary, in the aqueous ink composition according to the invention, its fluidity can be suppressed by curing. Accordingly, by increasing the surface tension so that the ink droplets remain as long as possible at the surface layer of the recording medium, satisfactory results may be obtained in both bleeding and image density.

In order to secure the image density, the recording medium needs to be wetted by the ink droplets to a certain degree when irradiated with active energy radiation. Therefore, the upper limit of the surface tension is preferably about 50 mN/m.

The surface tension of the aqueous ink composition may be measured by, for example, a plate method at 25° C.

<Ink Set>

The ink set according to the invention contains at least one kind of the aqueous ink composition described above, but if necessary, the ink set preferably includes at least one kind of a treatment liquid that can form an aggregate upon contact with the aqueous ink composition.

(Treatment Liquid)

The treatment liquid according to the invention forms an aggregate when it contacts the aqueous ink composition as described above. Specifically, the treatment liquid preferably includes at least an aggregating component that can form an aggregate by aggregating the particles of a colorant or the like that are dispersed in the ink composition, and the treatment liquid may include other components as necessary. When the treatment liquid is used together with the aqueous ink composition, for example, inkjet recording may be performed at high speed, and an image that exhibits excellent delineability with high density and resolution (for example, reproducibility of fine lines or fine sections) may be recorded even at high speed.

(Aggregating Component)

The treatment liquid may contain at least one kind of aggregating component that can form an aggregate upon contact with the aqueous ink composition. When the aqueous ink composition applied onto a recording medium and the aggregating component included in the treatment liquid contact each other, aggregation of the pigment or the like, which is stably dispersed in the aqueous ink composition, may be promoted.

An example of the treatment liquid may be a liquid that can cause formation of an aggregate by changing the pH of the aqueous ink composition. The pH (25° C.±1° C.) of the treatment liquid is preferably from 1 to 6, more preferably from 1.2 to 5, even more preferably from 1.5 to 4, from the viewpoint of the speed of aggregation of the ink composition. In that case, the pH (25° C.±1° C.) of the ink composition used in the discharge process is preferably from 7.5 to 9.5 (more preferably from 8.0 to 9.0).

In the invention, it is preferable that the pH (25° C.) of the ink composition be 7.5 or higher, and the pH (25° C.) of the treatment liquid be 1.5 to 3, from the viewpoint of improving image density or resolution, and increasing the speed of inkjet recording.

The aggregating component may be used singly or as a mixture of two or more kinds.

The treatment liquid may include at least one kind of acidic compound as an aggregating component. Examples of the acidic compound that may be used in the invention include compounds having a phosphoric acid group, a phosphonic acid group, a phosphinic acid group, a sulfuric acid group, a sulfonic acid group, a sulfinic acid group or a carboxyl group, or a salt thereof (for example, a polyvalent metal salt). Among them, the acidic compound is more preferably a compound having a phosphoric acid group or a carboxyl group, yet more preferably a compound having a carboxyl group, from the viewpoint of the aggregation rate of the ink composition.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid and nicotinic acid, as well as derivatives thereof and salts thereof (for example, polyvalent metal salts). These compounds may be used singly, or may be used in combination of two or more kinds.

The content of the acidic compound in the treatment liquid is preferably from 5 to 95% by mass, more preferably from 10 to 80% by mass, even more preferably from 15 to 50% by mass, particularly preferably from 18 to 30% by mass, with respect to the total mass of the treatment liquid, from the viewpoint of the aggregation effect.

Another example of the treatment liquid contains at least one kind of polyvalent metal salt as an aggregating component. By including a polyvalent metal salt, high-speed aggregation properties may be enhanced. Examples of the polyvalent metal salt include salts of alkaline earth metals of Group 2 of the Periodic Table (for example, magnesium and calcium), salts of transition metals of Group 3 of the Periodic Table (for example, salts of lanthanum), salts of cations of Group 13 of the Periodic Table (for example, aluminum), and salts of lanthanides (for example, neodymium). Suitable examples of the metal salt include carboxylates (formate, acetate, benzoate, or the like), nitrate, chloride and thiocyanate. Among them, preferred examples include calcium salts or magnesium salts of carboxylic acids (formic acid, acetic acid, benzoic acid, or the like), calcium salt or magnesium salt of nitric acid, calcium chloride, magnesium chloride, and calcium salt or magnesium salt of thiocyanic acid.

The content of the polyvalent metal salt in the treatment liquid is preferably in the range of from 1 to 10% by mass, more preferably from 1.5 to 7% by mass, even more preferably from 2 to 6% by mass, from the viewpoint of the aggregation effect.

Furthermore, the treatment liquid may include at least one kind of cationic organic compound as an aggregating component. Examples of the cationic organic compound include cationic polymers such as amine salts (for example, hydrochlorides or acetates of laurylamine, rosin amine), ammonium salts (for example, lauryltrimethylammonium chloride, benzyltributylammonium chloride, benzalkonium chloride), poly(vinylpyridine) salts, polyalkylaminoethyl acrylate, polyalkylaminoethyl methacrylate, poly(vinylimidazole), polyethyleneimine, polybiguanide, polyguanide, polyallylamine, and derivatives thereof.

The content of the cationic organic compound in the treatment liquid is preferably from 1 to 50% by mass, more preferably from 2 to 30% by mass, from the viewpoint of the aggregation effects.

Among the compounds described above, a divalent or higher-valent carboxylic acid, or a divalent or higher-valent cationic organic compound is preferred as the aggregating component, from the viewpoint of aggregation properties and abrasion resistance of the image.

(Other Components)

The treatment liquid according to the invention may typically contain a water-soluble organic solvent, in addition to the aggregating component. Further, the treatment liquid may include additional additives of various kinds, as long as the effect of the invention is not impaired. Details of the water-soluble organic solvent may be the same as that described in the above section concerning the aqueous ink composition.

Examples of the other additives include known additives such as an anti-drying agent (wetting agent), an anti-fading agent, an emulsification stabilizer, a penetration promoting agent, an ultraviolet absorbent, a preservative, an antifungal agent, a pH adjusting agent, a surface tension adjusting agent, a defoaming agent, a viscosity adjusting agent, a dispersant, a dispersion stabilizer, an antirusting agent, and a chelating agent. Those mentioned in the above section concerning the aqueous ink composition are also applicable.

The viscosity of the treatment liquid is preferably in the range of from 1 to 30 mPa·s, more preferably in the range of from 1 to 20 mPa·s, even more preferably in the range of from 2 to 15 mPa·s, particularly preferably in the range of from 2 to 10 mPa·s, from the viewpoint of the aggregation rate of the ink composition.

The viscosity is a value measured at 20° C. using VISCOMETER TV-22 (trade name, manufactured by Toki Sangyo Co., Ltd.)

The surface tension of the treatment liquid is preferably from 20 to 60 mN/m, more preferably from 20 to 45 mN/m, even more preferably from 25 to 40 mN/m, from the viewpoint of the aggregation rate of the ink composition.

The surface tension is a value measured at 25° C. using an automatic surface tensiometer (trade name: CBVP-Z, manufactured by Kyowa Interface Science Co., Ltd.)

<Image Forming Method>

The image forming method according to the invention includes the steps of applying the aqueous ink composition onto a recording medium by an inkjet method, and irradiating the aqueous ink composition applied onto the recording medium, with active energy radiation, thereby fixing the image. The image forming method may include other steps, as necessary.

By performing the image forming method as described above, images having excellent fixability may be formed.

The method of forming an image by applying the aqueous ink composition according to the invention on a recording medium is not particularly limited, and any known image forming method may be used. Exemplary methods include those in which the aqueous ink composition is applied onto a recording medium by means of an inkjet system, a mimeograph system, or a press transfer system. Among them, an image forming method including the step of applying the aqueous ink composition according to the invention by an inkjet system is preferred from the viewpoint of reducing the size of recording apparatus and performing high-speed recording.

(Inkjet System)

Recording of images using an inkjet system may be carried out specifically by ejecting, by applying energy, a liquid composition onto a desired recording medium, such as ordinary paper, resin-coated paper, paper used exclusively for inkjet recording as described in, for example, JP-A Nos. 8-169172, 8-27693, 2-276670, 7-276789, 9-323475, 62-238783, 10-153989, 10-217473, 10-235995, 10-337947 and 10-217597, films, paper commonly used for general purpose and electrophotography, cloth, glass, metal, ceramic or the like. Furthermore, as an inkjet system preferable for the invention, the method described in paragraphs [0093] to [0105] of JP-A No. 2003-306623 may be applied.

The inkjet system is not particularly limited, and may be selected from any known systems, for example, a charge control system in which ink is discharged by utilizing electrostatic attraction force; a drop-on-demand system in which vibration pressure of a piezo element is employed (pressure pulse system); an acoustic inkjet system in which electric signals are converted to acoustic beam and ink is irradiated with the acoustic beam, whereby the ink is discharged by means of radiation pressure; a thermal inkjet (BUBBLEJET (registered trademark)) system in which ink is discharged by pressure generated by heating the ink to form air bubbles.

The inkjet head used in these inkjet systems may be either an on-demand system or a continuous system. In addition, the ink nozzles or the like used for recording in these inkjet methods described above are not particularly limited, and may be appropriately selected in accordance with the intended use.

The inkjet methods also include a method in which ink having a low color density (photoink) is discharged in a large number of droplets having a small volume; a method in which image quality is improved by using plural inks having the substantially same color but different densities; or a method in which a colorless transparent ink is used.

The inkjet method may employ a shuttle system in which a short serial head is used for recording by scanning the same in a width direction of the recording medium; or a line system in which a line head, including recording elements arranged so as to cover the whole length corresponding to one side of the recording medium, is used. In the line system, image recording may be performed by scanning the entire surface of the recording medium with the line head, in a direction perpendicular to the direction in which the recording elements are arranged. Accordingly, in the line system, a delivery system such as a carriage along which the short head performs scanning is not required. Furthermore, since only the recording medium is moved without the need of carrying out a complicated process of controlling the scan movement of the carriage and the recording medium, the recording speed can be improved as compared with the shuttle system.

The image forming method according to the invention includes a step of irradiating the aqueous ink composition, which has been applied onto a recording medium, with active energy radiation. By irradiating the ink with active energy radiation, the polymerizable compound in the aqueous ink composition polymerizes and forms a cured film containing a colorant.

The active energy radiation used in the invention is not particularly limited, as long as the polymerizable compound can be polymerized by applying the same. Examples thereof include ultraviolet rays and electron beams, and among them, ultraviolet rays are preferred from the viewpoint of versatility.

(Ultraviolet Irradiation Lamp)

The means for performing ultraviolet irradiation may be a conventionally used unit, particularly preferably an ultraviolet irradiation lamp.

The ultraviolet irradiation lamp is preferably a low-pressure mercury lamp, in which the vapor pressure of mercury is from 1 to 10 Pa when emitting light, a high-pressure mercury lamp, or a mercury lamp coated with a fluorescent substance. The emission spectrum in an ultraviolet region of these mercury lamps is in the region of 450 nm or less, and particularly in the range of from 184 nm to 450 nm, which is suitable for efficiently causing reaction of the polymerizable compound included in an aqueous ink composition having a black or other color. The ultraviolet irradiation lamp is also suitable when a power supply is mounted in the printer, since a small-sized power source can be used. Examples of the mercury lamp that are put into actual use include a metal halide lamp, a high-pressure mercury lamp, an ultrahigh-pressure mercury lamp, a xenon flash lamp, a deep-UV lamp, a lamp that that excites a mercury lamp from an external source by using microwaves without an electrode, and UV laser beam. Since the emission wavelength regions of these lamps include the wavelength range mentioned above, any of these lamps are basically applicable as long as the power supply size, power input intensity, lamp shape or the like is acceptable. The light source may be selected also in view of the sensitivity of the polymerization initiator.

The necessary intensity of ultraviolet radiation is preferably from 500 to 5,000 mW/cm$^2$ in the region of a wavelength that is effective for curing. When the irradiation intensity is weak, an image having high quality and toughness may not be formed. Furthermore, when the irradiation intensity is too strong, the recording medium may be damaged, or color fading of the colorant may occur.

(Treatment Liquid Application Step)

From the viewpoint of forming an image at high speed, the image forming method according to the invention preferably includes a step of applying a treatment liquid, in addition to the step of applying ink and the step of irradiating with active energy radiation.

In the treatment liquid application step, a treatment liquid, which can form an aggregate when it contacts the ink composition, is applied onto a recording medium, and an aggregate is formed, whereby an image is formed.

The application of the treatment liquid may be carried out by a known method such as a coating method, an inkjet method or an immersion method. The coating method may be any known coating method using a bar coater, an extrusion die coater, an air doctor coater, a blade coater, a rod coater, a knife coater, a squeeze coater, a reverse roll coater, a bar coater, or the like. Details of the inkjet method are as described above.

The application of the treatment liquid may be carried out either before or after the application of the ink composition.

In the invention, the treatment liquid is preferably applied to a recording medium before the application of the ink composition. Specifically, in one preferred embodiment, the treatment liquid for aggregating the colorant in the ink composition is applied to the recording medium prior to applying the ink composition, and then forming an image by applying the ink composition so as to contact the treatment liquid that has been applied to the recording medium. In this way, the inkjet recording may be performed at high speed and an image having high density and resolution may be formed even if recording is performed at high speed.

The amount of the treatment liquid to be applied is not particularly limited as long as aggregation of the ink composition is caused, but may be determined such that the amount of the aggregating component (such as a divalent or higher-valent carboxylic acid or a cationic organic compound) is at least 0.1 g/m² or higher, preferably from 0.1 to 1.0 g/m², more preferably from 0.2 to 0.8 g/m². When the amount of application of the aggregating component is 0.1 g/m² or greater, the aggregation reaction may favorably progress, and when the amount of application is 1.0 g/m² or less, glossiness of the image may be suppressed not to become too high.

Furthermore, in the invention, it is preferred to further provide a heat drying step in which the treatment liquid applied onto the recording medium is dried by heating, between the application of the treatment liquid and the application of the ink composition. By drying the treatment liquid by heating the same prior to the application of the ink composition, favorable coloring properties of the ink such as an effect of preventing bleeding may be achieved, and a visible image having that exhibits favorable color density and color tone may be recorded.

The drying by heating may be carried out by using a known heating means such as a heater or an air blower such as a dryer, or a combination thereof. Examples of the heating method include a method of applying heat to the side of a recording medium that is opposite to the side to which the treatment liquid is applied with a heater; a method of applying warm or hot air to the surface of the recording medium to which the treatment liquid is applied; and a method in which heat is applied by using an infrared heater. The heating may be carried out by a combination of these methods.

The following are exemplary embodiments of the present invention. However, the present invention is not limited thereto.
1. An aqueous ink composition comprising:
   a) a water-based medium;
   b) a compound having an ethylenically unsaturated bond; and
   c) resin particles comprising a water-insoluble vinyl polymer and a water-insoluble photoinitiator.
2. The aqueous ink composition according to 1, wherein the water-insoluble vinyl polymer comprises a hydrophobic constituent unit and a hydrophilic constituent unit having an anionic group.
3. The aqueous ink composition according to 2, wherein the anionic group is a carboxyl group.
4. The aqueous ink composition according to 1, wherein the water-insoluble photoinitiator is at least one selected from an α-aminoketone or an acylphosphine oxide.
5. The aqueous ink composition according to 1, wherein the resin particles have a volume average particle diameter of 100 nm or less.
6. The aqueous ink composition according to 1, wherein the water-insoluble vinyl polymer has a weight average molecular weight of 2,000 to 100,000.
7. The aqueous ink composition according to 1, further comprising a colorant.
8. Use of the aqueous ink composition according to 1 in inkjet recording.
9. An ink set comprising at least one kind of the aqueous ink composition according to 1.
10. An inkjet image forming method comprising:
    discharging the aqueous ink composition according to 1 onto a recording medium by an inkjet method; and
    fixing an image formed from the aqueous ink composition on the recording medium by irradiating the image with active energy radiation.

EXAMPLES

Hereinafter, the present invention will be specifically explained with reference to the Examples, but the invention is not limited to these Examples. Unless otherwise specified, "parts" and "%" are on a mass basis.

Measurement of the volume average particle size was carried out using MICROTRAC UPA EX-150 (trade name, manufactured by Nikkiso Co., Ltd.) while appropriately diluting the dispersion liquid to a concentration suitable for the measurement. The measurement was carried out under the same conditions (transmission of particles: transmissive, refractive index of particles: 1.51, shape of particles: non-spherical, density: 1.2 g/cm³, solvent: water, and cell temperature: 18 to 25° C.).

(Preparation of Water-insoluble Vinyl Polymer B-12)

A polymer B-12 was obtained by a conventional solution polymerization method, using 2-mercaptosuccinic acid as a chain transfer agent, butyl methacrylate and phenoxyethyl acrylate as monomers, and dimethyl 2,2'-azobisisobutyrate as a polymerization initiator.

The composition of the obtained polymer B-12 was confirmed by $^1$H-NMR, and the weight average molecular weight (Mw) determined by GPC was 20,000. The content of acidic groups (hereinafter, also referred to as "acid content") was 0.44 mmol/g.

A water-insoluble vinyl polymer B-11 was obtained in the same manner as that described above, except that the type and the amount of the monomers were changed. The weight average molecular weight (Mw) of the obtained water-insoluble vinyl polymer B-11 was 15,000, and the content of acidic groups was 0.38 mmol/g.

The components of water-insoluble vinyl polymers prepared in the following process are described above.

(Preparation of Water-insoluble Vinyl Polymer B-02)

A polymer B-02 was obtained by a conventional solution polymerization method, using phenoxyethyl methacrylate, methacrylic acid and methyl methacrylate as monomers, and dimethyl 2,2'-azobisisobutyrate as a polymerization initiator.

The composition of the obtained polymer B-02 was confirmed by $^1$H-NMR, and the weight average molecular weight (Mw) determined by GPC was 65,000. The content of acidic group was 1.16 mmol/g.

Water-insoluble vinyl polymers B-05, B-08 and B-09 were respectively prepared in the same manner as described above, except that the type and the amount of the monomers were changed. The weight average molecular weight (Mw) of the obtained water-insoluble vinyl polymer B-05 was 50,000 and the content of acidic groups was 1.39 mmol/g. The weight average molecular weight (Mw) of the water-insoluble vinyl polymer B-08 was 80,000 and the content of acidic groups was 0.93 mmol/g. The weight average molecular weight (Mw) of the water-insoluble vinyl polymer B-09 was 35,000 and the content of acidic groups was 0.81 mmol/g.

Preparation of Initiator-containing Resin Particles

Preparation Example 1

Preparation of Initiator-containing Resin Particles L-1

A mixed solution of 40 g of isopropyl alcohol, 60 g of tert-butanol, 12 g of the water-insoluble vinyl polymer B-12

(acid content: 0.44 mmol/g), and 8 g of IRGACURE 819 (trade name, manufactured by BASF Japan Inc., water-insoluble photoinitiator) was prepared, and 4.8 g of 1 mol/L sodium hydroxide aqueous solution were added thereto. Then, the temperature was elevated to 60° C. Subsequently, 160 g of water were slowly added thereto over 40 minutes while stirring the mixture, thereby obtaining an aqueous dispersion. Thereafter, 151 g in total of isopropanol, tert-butanol and water were distilled off under reduced pressure. A dispersion of initiator-containing resin particles (L-1) having a solid content concentration of 15% was thus obtained.

Preparation Example 4

Preparation of Initiator-containing Resin Particles L-7 to L-12

Dispersions of initiator-containing resin particles L-7 to L-12 were obtained in the same manner as in the preparation of the dispersion of initiator-containing resin particles L-6, except that the water-insoluble vinyl polymer and the water-insoluble photoinitiator as shown in Table 1 were used in place of the water-insoluble vinyl polymer B-02 and IRGACURE 819, and the amount of raw materials was changed so as to satisfy the mass ratio as shown in Table 1.

TABLE 1

| Initiator-containing resin particles | Water-insoluble vinyl polymer (A) | Acid content (mmol/g) | Water-insoluble initiator (B) | (A):(B) (mass) | Particle size (nm) |
|---|---|---|---|---|---|
| L-1 | B-12 | 0.44 | Irgacure819 | 6:4 | 28 |
| L-2 | B-12 | 0.44 | Darocure1173 | 6:4 | 30 |
| L-3 | B-12 | 0.44 | Irgacure500 | 6:4 | 32 |
| L-4 | B-11 | 0.38 | Irgacure184 | 6:4 | 27 |
| L-5 | B-11 | 0.38 | Irgacure907 | 5:5 | 37 |
| L-6 | B-02 | 1.16 | Irgacure369 | 6:4 | 15 |
| L-7 | B-05 | 1.39 | Irgacure907 | 6:4 | 26 |
| L-8 | B-02 | 1.16 | Irgacure500 | 5:5 | 18 |
| L-9 | B-08 | 0.93 | Irgacure819 | 5:5 | 36 |
| L-10 | B-09 | 0.81 | Irgacure651 | 5:5 | 42 |
| L-11 | B-05 | 1.39 | Irgacure500 | 7:3 | 21 |
| L-12 | B-05 | 1.39 | Irgacure819 | 7:3 | 24 |

The volume average particle size of the initiator-containing resin particles was 28 nm.

Preparation Example 2

Preparation of Initiator-containing Resin Particles L-2 to L-5

Dispersions of initiator-containing resin particles L-2 to L-5 were obtained in the same manner as in the preparation of the dispersion of initiator-containing resin particles L-1, except that the water-insoluble vinyl polymer and the water-insoluble photoinitiator as shown in Table 1 were used in place of the water-insoluble vinyl polymer B-12 and IRGACURE 819, and that the amount of raw materials was changed so as to satisfy the mass ratio as shown in Table 1.

Preparation Example 3

Preparation of Initiator-containing Resin Particles L-6

33 g of a methyl ethyl ketone solution containing 45% of the water-insoluble vinyl polymer B-02 were measured, and 36 g of isopropanol, 5 g of IRGACURE 819, and 13 ml of 1 mol/L NaOH aqueous solution were added thereto. The temperature inside the reaction vessel was increased to 80° C. Subsequently, 80 g of distilled water was slowly added thereto over 40 minutes while stirring the mixture, thereby obtaining an aqueous dispersion. Thereafter, 67 g in total of isopropanol, methyl ethyl ketone and water were distilled off under reduced pressure. A dispersion of initiator-containing resin particles L-6 having a solid content concentration of 20% was thus obtained.

<Preparation of Aqueous Ink Composition>
<<Preparation of Cyan Ink D-1>>
(Preparation of Cyan Pigment Dispersion Liquid)

A mixed solution of 6 parts of styrene, 11 parts of stearyl methacrylate, 4 parts of styrene macromer AS-6 (trade name, manufactured by Toagosei Co., Ltd.), 5 parts of BLENMER PP-500 (trade name, manufactured by NOF Corporation), 5 parts of methacrylic acid, 0.05 parts of 2-mercaptoethanol and 24 parts of methyl ethyl ketone was prepared in a reaction vessel.

Further, a mixed solution of 14 parts of styrene, 24 parts of stearyl methacrylate, 9 parts of styrene macromer AS-6, 9 parts of BLENMER PP-500, 10 parts of methacrylic acid, 0.13 parts of 2-mercaptoethanol, 56 parts of methyl ethyl ketone and 1.2 parts of 2,2'-azobis(2,4-dimethylvaleronitrile) was prepared and placed in a dropping funnel.

Subsequently, the mixed solution in the reaction vessel was heated to 75° C. while stirring the same under a nitrogen atmosphere, and the mixed solution in the dropping funnel was slowly added dropwise to the reaction vessel over one hour. Two hours after the completion of dropwise addition, a solution prepared by dissolving 1.2 parts of 2,2'-azobis(2,4-dimethylvaleronitrile) in 12 parts by mass of methyl ethyl ketone was added dropwise to the reaction vessel over 3 hours, and the resulting mixture was aged for 2 hours at 75° C., and for another 2 hours at 80° C. A methyl ethyl ketone solution of a water-insoluble polymeric dispersant P-1 was thus obtained.

The water-insoluble polymeric dispersant was isolated by removing the solvent from a portion of the obtained water-insoluble polymeric dispersant solution, and the obtained solid fraction was diluted with tetrahydrofuran to have a concentration of 0.1% by mass. The weight average molecular weight of the polymeric dispersant was measured by GPC. As a result, the isolated solid fraction was found to have a weight average molecular weight of 25,000 in terms of polystyrene standard.

5.0 g (in terms of solids content) of the methyl ethyl ketone solution of the water-insoluble polymer dispersant P-1 obtained above, 10.0 g of cyan pigment (Pigment Blue 15:3, manufactured by Dainichiseika Color & Chemicals Manufacturing Co., Ltd.), 40.0 g of methyl ethyl ketone, 8.0 g of 1 mol/L aqueous solution of sodium hydroxide, 82.0 g of ion-exchanged water, and 300 g of 0.1-mm zirconia beads were placed in a vessel, and the mixture was dispersed for 6 hours at 1000 rpm with a dispersing machine (READY MILL, trade name, manufactured by Aimex Co., Ltd.) The obtained dispersion liquid was concentrated in an evaporator under reduced pressure, until methyl ethyl ketone was sufficiently distilled off and the pigment concentration was 15%. A cyan pigment dispersion C-1, in which the colorant was formed from the pigment coated with the water-insoluble polymeric dispersant, was thus obtained. The average particle size of the obtained cyan pigment dispersion C-1 was 77 nm.

A mixture including the following components was prepared by using the dispersion of initiator-containing resin particles L-1, NK ESTER A-400 (trade name, manufactured by Shin-Nakamura Chemical Co., Ltd., a compound having an ethylenically unsaturated bond, corresponding to Exemplary Compound 2-1) and the cyan pigment dispersion liquid C-1. Cyan ink D-1 was prepared as an aqueous ink composition by removing coarse particles from the mixture using a 5-μm filter.

<Composition of Cyan Ink D-1>

| | |
|---|---|
| Cyan pigment dispersion liquid C-1 | 26.6% |
| NK ESTER A-400 | 20% |
| Initiator-containing resin particles L-1 (in terms of solid content concentration of the initiator) | 2% |
| OLFINE E1010 (a surfactant, trade name, manufactured by Nisshin Chemical Industry Co., Ltd.) | 1% |
| Ion-exchanged water | balance |

<<Preparation of Cyan Inks D-2 to D-12>>

Cyan inks D-2 to D-12 as aqueous ink compositions were prepared in the same manner as the cyan ink D-1, except that the dispersions of initiator-containing resin particles L-2 to L-12 as shown in Table 2 were used in place of the dispersion of initiator-containing resin particles L-1, respectively.

<<Preparation of Cyan Inks DH-1 to DH-2>>

An aqueous dispersion LH-1, including IRGACURE 819, was prepared in accordance with the Preparation Example 1 described in paragraphs [0144] to [0147] of JP-W No. 2003-512484. Furthermore, an initiator dispersion LH-2 was prepared in accordance with the method described in the first exemplary embodiment of WO 01/057145, using NK ESTER A-9530 (trade name, manufactured by Shin-Nakamura Chemical Co., Ltd.) as an ethylenically unsaturated compound, and IRGACURE 1700 (trade name, manufactured by BASF Japan Inc.) as an initiator.

Cyan inks DH-1 to DH-2 as aqueous ink compositions were prepared in the same manner as the cyan ink D-1, except that the initiator dispersions LH-1 and LH-2 were used in place of the dispersion of the initiator-containing resin particles L-01, respectively.

(Evaluation)

The cyan inks (hereinafter, also simply referred to as "ink") as prepared above were subjected to a test for evaluating ink dischargeability (discharge stability) and a test for evaluating image fixability test. The results are shown in Table 2.

(Dischargeability)

The inks obtained above were filled in a cartridge for an inkjet printer (GELJET G717, trade name, manufactured by Ricoh Co., Ltd.), and the inks were discharged onto a recording medium (TOKUBISHI DOUBLE-SIDED ART PAPER N, manufactured by Mitsubishi Paper Mills, Ltd.) using a printer head for GELJET G7171, at a resolution of 1200×600 dpi and at a discharge amount of 12 pL. The discharge was carried out in a continuous manner for 5 hours, and thereafter the state of dischargeability (discharge stability) in accordance with the following evaluation criteria.

-Evaluation Criteria-

A: Defective discharge was not observed.

B: Defective discharge was almost not observed, and the level was not problematic for practical applications.

C: Defective discharge was significant, and the level was problematic for practical applications.

(Fixability)

-Abrasion Resistance-

A recording medium (TOKUBISHI DOUBLE-SIDED ART PAPER N, trade name, manufactured by Mitsubishi Paper Mill, Ltd.) was fixed on a stage that moves at a rate of 500 mm/second. Subsequently, a cyan-color solid image was printed thereon using a printer head (GELJET GX5000, trade name, manufactured by Ricoh Co., Ltd.) that was fixed in an inclined manner with respect to the scanning direction. The printing was performed by a line system at a resolution of 1200×600 dpi and a discharge amount of 3.5 pL.

Immediately after the printing, the image portion was dried for 3 seconds at 60° C., and was cured by irradiating the same with ultraviolet radiation at an amount of exposure of 800 mJ/cm$^2$ using a high-pressure mercury lamp. A print sample was thus prepared.

An unprinted recording medium (TOKUBISHI DOUBLE-SIDED ART PAPER N, trade name, manufactured by Mitsubishi Paper Mill, Ltd.) was wound around a paperweight (weight: 470 g, size: 15 mm×30 mm×120 mm), and this was used to rub the print sample in a back-and-forth manner three times, under load corresponding to 260 kg/m$^2$. The area at which the unprinted recording medium contacted the print sample was 150 mm$^2$. The image portion of the print sample after being rubbed was visually observed and evaluated in accordance with the following evaluation criteria.

-Evaluation Criteria-

A: Peeling of image (colorant) was not observed in the image portion.

B: A slight degree of peeling of image (colorant) was observed in the image portion.

C: A slight degree of peeling of image (colorant) was observed in the image portion, but this was not problematic for practical applications.

D: Peeling of image (colorant) was observed in the image portion, and this was problematic for practical applications.

TABLE 2

| Ink | Initiator-containing resin particles | Dischargeability | Fixability | Notes |
|---|---|---|---|---|
| D-1 | L-1 | A | A | The invention |
| D-2 | L-2 | A | B | The invention |
| D-3 | L-3 | A | B | The invention |
| D-4 | L-4 | A | B | The invention |
| D-5 | L-5 | A | A | The invention |
| D-6 | L-6 | A | A | The invention |
| D-7 | L-7 | A | A | The invention |
| D-8 | L-8 | A | B | The invention |
| D-9 | L-9 | A | A | The invention |
| D-10 | L-10 | A | C | The invention |
| D-11 | L-11 | A | B | The invention |
| D-12 | L-12 | A | A | The invention |

TABLE 2-continued

| Ink | Initiator-containing resin particles | Dischargeability | Fixability | Notes |
|---|---|---|---|---|
| DH-1 | LH-1 | C | C | Comparative Example |
| DH-2 | LH-2 | B | D | Comparative Example |

As it can be seen from Table 2, it was found that the aqueous ink compositions according to the invention exhibited satisfactory fixability and high curing sensitivity, in addition to satisfactory dischargeability (droplet discharge stability).

On the other hand, the aqueous ink composition in which conventionally known photoinitiator dispersions were used exhibited poor dischargeability and fixability (curing sensitivity) as compared with the aqueous ink compositions according to the invention. In particular, it was found that these aqueous ink composition were difficult to balance the dischargeability and the fixability (curing sensitivity) thereof.

In view of the above results, it can be concluded that the invention can provide an aqueous ink composition that exhibits excellent dischargeability and fixability that have not been previously achieved.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous ink composition comprising:
   a) a water-based medium;
   b) a compound having an ethylenically unsaturated bond; and
   c) resin particles comprising a water-insoluble vinyl polymer and a water-insoluble photoinitiator,
   wherein the water-insoluble vinyl polymer contains at least one kind of hydrophilic constituent unit having an ion-dissociable group, the content of the dissociable group being from 0.1 to 3.0 mmol/g based on the total amount of the water-insoluble polymer.

2. The aqueous ink composition according to claim 1, wherein the water-insoluble vinyl polymer comprises a hydrophobic constituent unit.

3. The aqueous ink composition according to claim 1, wherein the water-insoluble photoinitiator is at least one selected from an α-aminoketone or an acylphosphine oxide.

4. The aqueous ink composition according to claim 1, wherein the resin particles have a volume average particle diameter of 100 nm or less.

5. The aqueous ink composition according to claim 1, wherein the water-insoluble vinyl polymer has a weight average molecular weight of 2,000 to 100,000.

6. The aqueous ink composition according to claim 1, further comprising a colorant.

7. Use of the aqueous ink composition according to claim 1 in inkjet recording.

8. An ink set comprising at least one kind of the aqueous ink composition according to claim 1.

9. An inkjet image forming method comprising:
   discharging the aqueous ink composition according to claim 1 onto a recording medium by an inkjet method; and
   fixing an image formed from the aqueous ink composition on the recording medium by irradiating the image with active energy radiation.

10. The aqueous ink composition according to claim 1, wherein the ion-dissociable group is an anionic dissociable group.

11. The aqueous ink composition according to claim 1, wherein the ion-dissociable group is selected from a carboxyl group, a sulfo group or a phosphoric acid group.

* * * * *